US012631513B2

(12) United States Patent
Nahata et al.

(10) Patent No.: US 12,631,513 B2
(45) Date of Patent: May 19, 2026

(54) TECHNOLOGIES FOR IMPROVED VISUALIZATION OF GAS LEAK DETECTION DATA

(71) Applicant: ABB Schweiz AG, Baden (CH)

(72) Inventors: Ajay Nahata, San Jose, CA (US); J. Brian Leen, Sunnyvale, CA (US)

(73) Assignee: ABB Schweiz AG, Baden (CH)

( * ) Notice: Subject to any disclaimer, the term of this patent is extended or adjusted under 35 U.S.C. 154(b) by 522 days.

(21) Appl. No.: 17/738,533

(22) Filed: May 6, 2022

(65) Prior Publication Data

US 2022/0357231 A1     Nov. 10, 2022

Related U.S. Application Data

(60) Provisional application No. 63/185,344, filed on May 6, 2021.

(51) Int. Cl.
*G06F 11/30*      (2006.01)
*G01M 3/16*      (2006.01)

(52) U.S. Cl.
CPC ..................................... *G01M 3/16* (2013.01)

(58) Field of Classification Search
CPC ...................................................... G01M 3/16
See application file for complete search history.

(56) References Cited

U.S. PATENT DOCUMENTS

| | | | |
|---|---|---|---|
| 7,082,370 B2 | 7/2006 | Ardo et al. | |
| 7,385,681 B2 | 6/2008 | Ninomiya et al. | |
| 10,634,575 B2 * | 4/2020 | Miranda | ................. G01M 3/38 |
| 10,928,268 B2 | 2/2021 | Mcneil | |
| 2020/0116583 A1 | 4/2020 | Hedberg | |
| 2021/0140934 A1 * | 5/2021 | Smith | ................. G05D 1/0022 |

FOREIGN PATENT DOCUMENTS

| | | |
|---|---|---|
| CN | 107917341 A | 4/2018 |
| WO | 2020206008 A1 | 10/2020 |

OTHER PUBLICATIONS

Anthony Schenck et al (hereinafter Schenck) "ArileakSlam: Detection of Pressurized Air Leaks Using Passive Ultrasonic Sensors", IEEE, (Oct. 27, 2019), doi: 10.1109/43011.2019.8956631, pp. 1-4, XP033685497. (Year: 2019).*

(Continued)

*Primary Examiner* — Phuong Huynh
(74) *Attorney, Agent, or Firm* — McCarter & English, LLP

(57)     ABSTRACT
A visualization system for visualizing gas leak detection data including a processor in communication with at least one memory device is provided herein. The processor is configured to receive, from one or more sensors, gas measurement data for a plurality of measurement locations within a survey area; receive, from the at least one memory device, a geographic representation of the survey area; determine, based upon the gas measurement data, estimated gas source locations of the plurality of measurement locations; and apply a smoothing algorithm to the estimated gas source locations to create a multi-dimensional density plot.

20 Claims, 11 Drawing Sheets

(56) References Cited

OTHER PUBLICATIONS

Eckert-Gallup et al. (hereinafter "Eckert-Gallup") "Kernel density estimation (KDE) with adaptive bandwidth selection for environmental contours of extreme sea states", Oceans 2016 Monterey, IEEE, (Sep. 19, 2016), doi: 10.1109/OCEANS 2016.7761150, pp. 1-5, XP 033014315. (Year: 2016).*

Eckert-Gallup et al., "Kernel density estimation (KDE) with adaptive bandwidth selection for environmental contours of extreme sea states", Oceans 2016 MTS/IEEE Monterey, IEEE, (Sep. 19, 2016), doi:10.1109/OCEANS.2016.7761150, pp. 1-5, XP033014315.

Extended European Search Report issued in European Patent Application No. 22172066.7, dated Oct. 10, 2022, 11 pages.

Schenck et al., "AirleakSlam: Detection of Pressurized Air Leaks Using Passive Ultrasonic Sensors", 2019 IEEE Sensors, IEEE, (Oct. 27, 2019), doi:10.1109/SENSORS43011.2019.8956631, pp. 1-4, XP033685497.

* cited by examiner

Receiving gas measurements within a survey area
410

Receiving a geographic representation of the survey area
420

Determining estimated gas source locations
430

Applying a smoothing algorithm to the estimated gas source locations to create a density plot
440

400

700

702

704

TECHNOLOGIES FOR IMPROVED VISUALIZATION OF GAS LEAK DETECTION DATA

CROSS-REFERENCE TO RELATED APPLICATIONS

The present application claims the benefit of priority to U.S. Provisional Application No. 63/185,344, filed on May 6, 2021, the contents of which are hereby incorporated by reference in its entirety.

BACKGROUND

The field of the disclosure relates to technologies for improving visualization of gas leak detection data.

A typical gas leak detection survey results in data regarding locations where gas was detected (and, often, concentrations of one or more gases measured at those locations). This data may be used to predict estimated gas source locations suspected to be emitting the detected gas. In some gas leak detection surveys, the data regarding gas detection locations and/or estimated gas source locations is displayed on a geographic map using markers. However, interpreting these markers can be difficult. Accordingly, a problem with current gas leak detection data visualization is that finding the actual gas leak is very difficult due to the interpretation of the markers being difficult.

Thus, it is desirable to improve the visualization of gas leak detection data to simplify and make more efficient the process for finding actual gas leaks.

BRIEF DESCRIPTION

In one aspect, a visualization system for visualizing gas leak detection data including a processor in communication with at least one memory device is provided. The processor is configured to: (i) receive, from one or more sensors, gas measurement data for a plurality of measurement locations within a survey area, (ii) receive, from the at least one memory device, a geographic representation of the survey area, (iii) determine, based upon the gas measurement data, estimated gas source locations of the plurality of measurement locations, and (iv) apply a smoothing algorithm to the estimated gas source locations to create a multi-dimensional density plot.

In another aspect, a computer-implemented method is provided. The computer-implemented method is performed by a visualization system including a processor in communication with at least one memory device. The computer-implemented method includes: (i) receiving, from one or more sensors, gas measurement data for a plurality of measurement locations within a survey area, (ii) receiving, from the at least one memory device, a geographic representation of the survey area, (iii) determining, based upon the gas measurement data, estimated gas source locations of the plurality of measurement locations, and (iv) applying a smoothing algorithm to the estimated gas source locations to create a multi-dimensional density plot.

In yet another aspect, a non-transitory computer-readable media having computer-executable instructions embodied thereon is provided. When executed by a visualization system including a processor in communication with a memory device, the computer-executable instructions cause the processor to: (i) receive, from one or more sensors, gas measurement data for a plurality of measurement locations within a survey area, (ii) receive, from the at least one memory device, a geographic representation of the survey area, (iii) determine, based upon the gas measurement data, estimated gas source locations of the plurality of measurement locations, and (iv) apply a smoothing algorithm to the estimated gas source locations to create a multi-dimensional density plot.

DRAWINGS

These and other features, aspects, and advantages of the present disclosure will become better understood when the following detailed description is read with reference to the accompanying drawings in which like characters represent like parts throughout the drawings, wherein.

Figure 1:
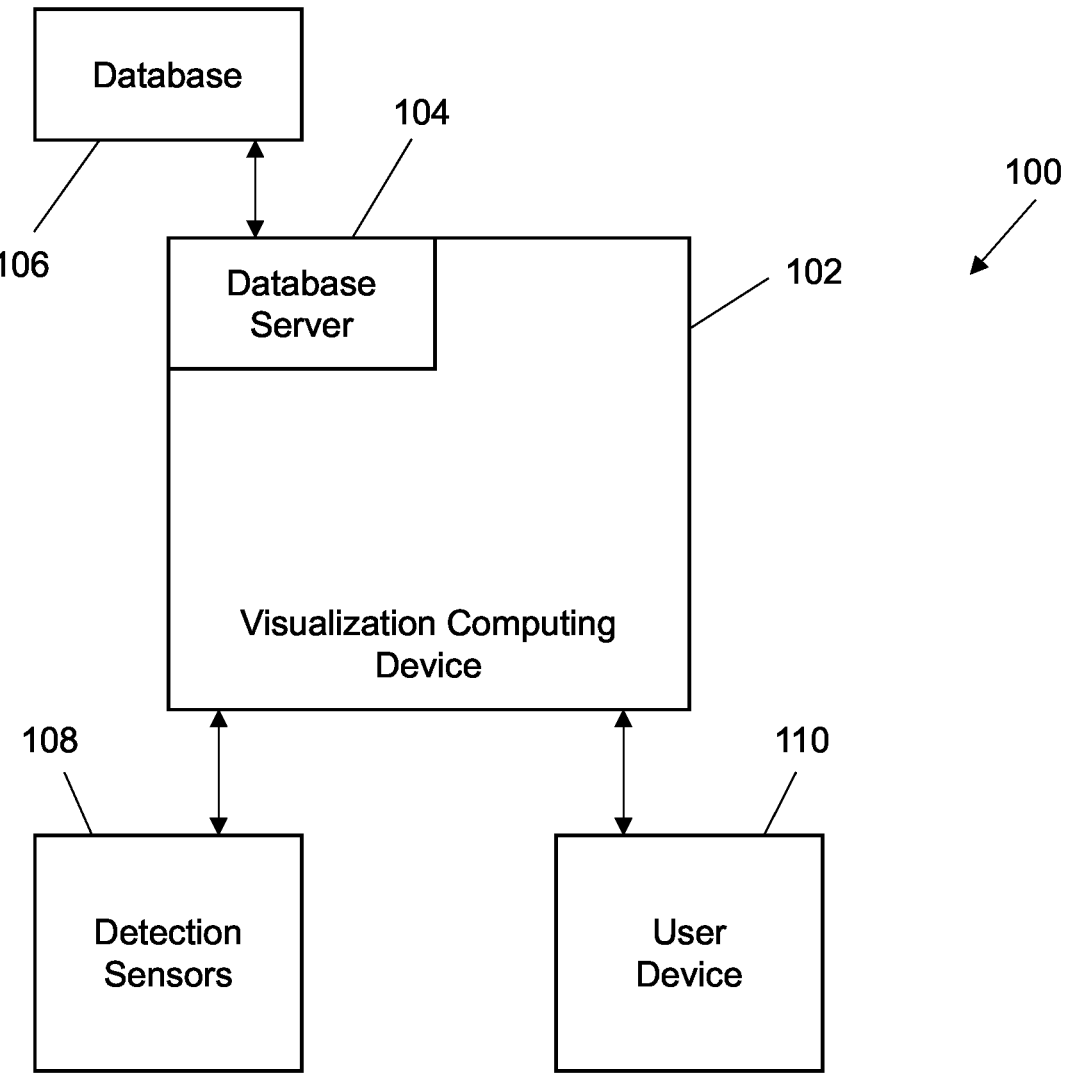
FIG. 1 depicts a simplified block diagram of a computer system in an exemplary embodiment.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As discussed previously, typical gas leak detection systems use markers on a geographic map to show a potential gas leak location. These markers are hard to interpret and make the actual localization of a gas leak very difficult.

In the embodiments described herein, technologies using smoothing algorithms for improved visualization of gas leak detection data are described. The presently disclosed technologies apply smoothing algorithms to an estimated gas source location (or similar) data to indicate the likely location for each actual gas source in the surveyed area, in a manner analogous to a probability distribution plot. Plots based on this approach allow for a more informed approach to finding actual gas sources.

Portable gas analyzers, which include one or more detection sensors as described herein, have allowed for increased ease in finding emissions of specified gases over a large area by walking, driving, or flying with the instrument though the area. During the course of the survey, isolated or closely spaced Gaussian-like peaks emerge in the time trace of the gas concentrations as the analyzer comes either near a gas source or is appropriately downwind of the gas source. Using global positioning system (GPS) location data of the gas detections as well as the velocity data (including both speed and direction) of the analyzer movement and local instantaneous wind data, the estimated location(s) of one or more gas sources can be calculated from the data collected. For example, such a gas leak detection survey can be performed by any of ABB's MicroGuard™ (walking survey), MobileGuard™ (driving survey), and HoverGuard™ (flying survey, using an unmanned aerial vehicle (UAV)) gas leak detection solutions, all commercially available in the United States from ABB Inc. In other embodiments, any gas leak detection survey platform that produces estimated gas source locations (or the data needed to calculate estimated gas source locations) can be used.

For example, a UAV may follow a flight path through a survey area, while detection sensors (e.g., of a portable gas analyzer) carried by the UAV collect measurements of the concentration of one or more gases of interest at points along the flight path. As described above, the detection sensors also collect data regarding location (e.g., GPS data) and velocity (e.g., UAV velocity data, wind velocity data) corresponding to each gas concentration measurement.

FIG. 1 depicts a simplified block diagram of a computer system 100 in an exemplary embodiment. In the exemplary embodiment, computer system 100 may be used for generating a gas leak detection visualization based upon an analysis of received sensor data, as described further herein. In the exemplary embodiment, system 100 may include a visualization computing device 102 and a database server 104. Visualization computing device 102 may be in communication with one or more databases 106 (or other memory devices), detection sensors 108, and/or user devices 110.

Database server 104 may be communicatively coupled to database 106 that stores data. In one embodiment, database 106 may include map data, historical gas leak data, historical gas visualization data, etc. In the exemplary embodiment, database 106 may be stored remotely from visualization computing device 102. In some embodiments, database 106 may be decentralized. In the exemplary embodiment, a user may access database 106 and/or visualization computing device via user device 110.

Detection sensors 108 may be communicatively coupled with visualization computing device 102. In some embodiments, detection sensors 108 may be associated with, or otherwise in communication with, a detection vehicle located proximate the site of the gas leak. For example, detection sensors 108 may be coupled to an unmanned aerial vehicle (UAV) that takes measurements at the site of the gas leak. Detection sensors 108 may include any sensors associated with detecting and locating a gas leak. For example, detection sensors 108 may include any of gas concentration sensors, global positioning system (GPS) sensors, wind sensors, height sensors, accelerometers, gyroscopes, and any other suitable sensors.

Detection sensors 108 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Visualization computing device 102 may be in communication with a plurality of user devices 110. In the exemplary embodiment, user devices 110 may be a smartphone, tablet, or laptop that one or more users have at a survey location. That is, user devices 110 may be computers that include a web browser or a software application, which enables user computing devices 110 to access remote computer devices, such as visualization computing device 102, using the Internet or other network. More specifically, user devices 110 may be communicatively coupled to visualization computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Figure 2:
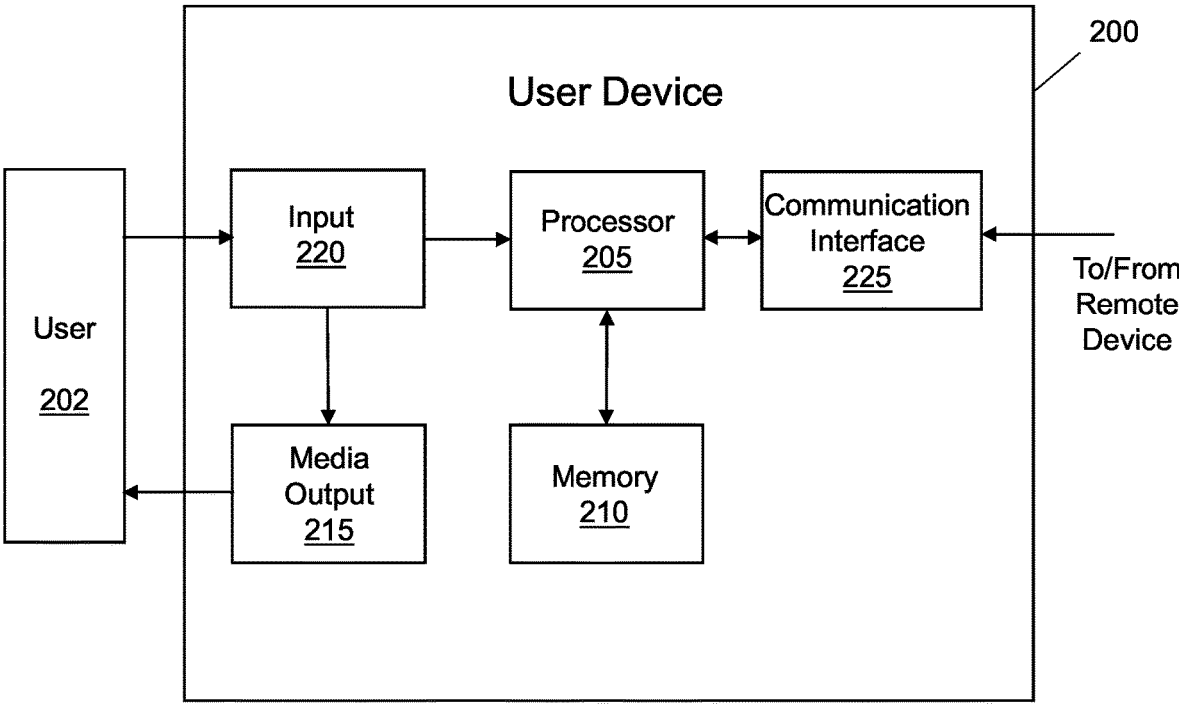
FIG. 2 depicts a user device in an exemplary embodiment.

FIG. 2 depicts a user device 200, such as user device 110 as shown in FIG. 1. User device 200 may be operated by a user 202. User device 200 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or detection data to be stored and retrieved. Memory area 210 may include one or more computer readable media.

User device 200 may also include at least one media output component 215 for presenting information to user 202. Media output component 215 may be any component capable of conveying information to user 202. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 202. A graphical user interface may include, for example, one or more visualizations of a gas leak. In some embodiments, user device 200 may include an input device 220 for receiving input from user 202. User 202 may use input device 220 to, without limitation, select and/or enter data, input commands to change views of the visualization, confirm or deny whether a gas leak was present at the predicted location, etc.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User device 200 may also include a communication interface 225, communicatively coupled via a network to visualization computing device 102 (shown in FIG. 1). Communication interface 225 may include, for example, a wired or wireless network adapter and/or a wireless data transceiver for use with a mobile telecommunications network.

Stored in memory area 210 are, for example, computer-readable instructions for providing a user interface to user 202 via media output component 215 and, optionally, receiving and processing input from input device 220. A user interface may include, among other possibilities, a web browser and/or a client application. Web browsers enable users, such as user 202, to display and interact with media and other information typically embedded on a web page or a website.

Figure 3:
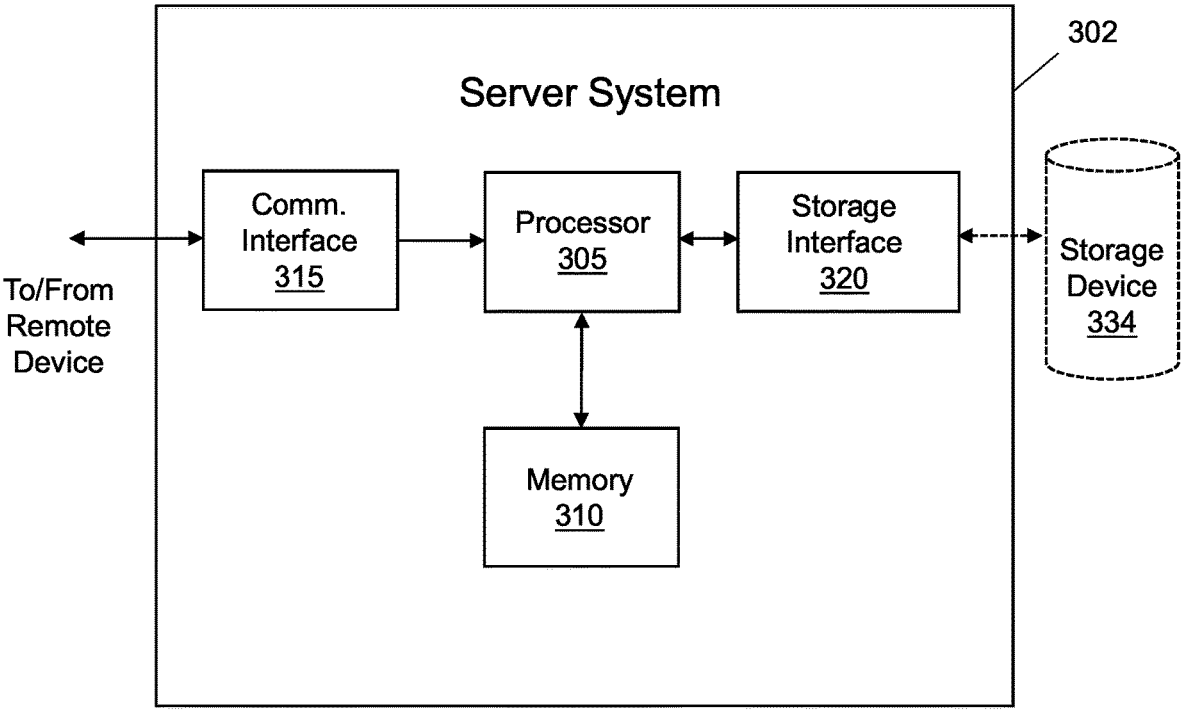
FIG. 3 depicts a server system in an exemplary embodiment.

FIG. 3 depicts a server system 302 such as modeling computing device 102 and detection sensors 108, as shown in FIG. 1, and in accordance with one exemplary embodiment of the present disclosure. Accordingly, server system 300 may include a processor 305 for executing instructions. Instructions may be stored in a memory area 310. Processor 305 may include one or more processing units (e.g., in a multi-core configuration).

Processor 305 may be operatively coupled to a communication interface 315 such that server system 300 is capable of communicating with a remote computing device. For example, communication interface 315 may receive requests from user devices 110 via the Internet and/or over a computer network.

Processor 305 may also be operatively coupled to a storage device 334 (e.g., database 106, shown in FIG. 1). Storage device 325 may be any computer-operated hardware suitable for storing and/or retrieving data. In some embodiments, storage device 325 may be integrated in server system 300. For example, server system 300 may include one or more hard disk drives as storage device 325. In other embodiments, storage device 325 may be external to server system 300 and may be accessed by a plurality of server systems 300. For example, storage device 325 may include a storage area network (SAN), a network attached storage (NAS) system, and/or multiple storage units such as hard disks and/or solid-state disks in a redundant array of inexpensive disks (RAID) configuration.

In some embodiments, processor 305 may be operatively coupled to storage device 325 via a storage interface 320. Storage interface 320 may be any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Figure 4:
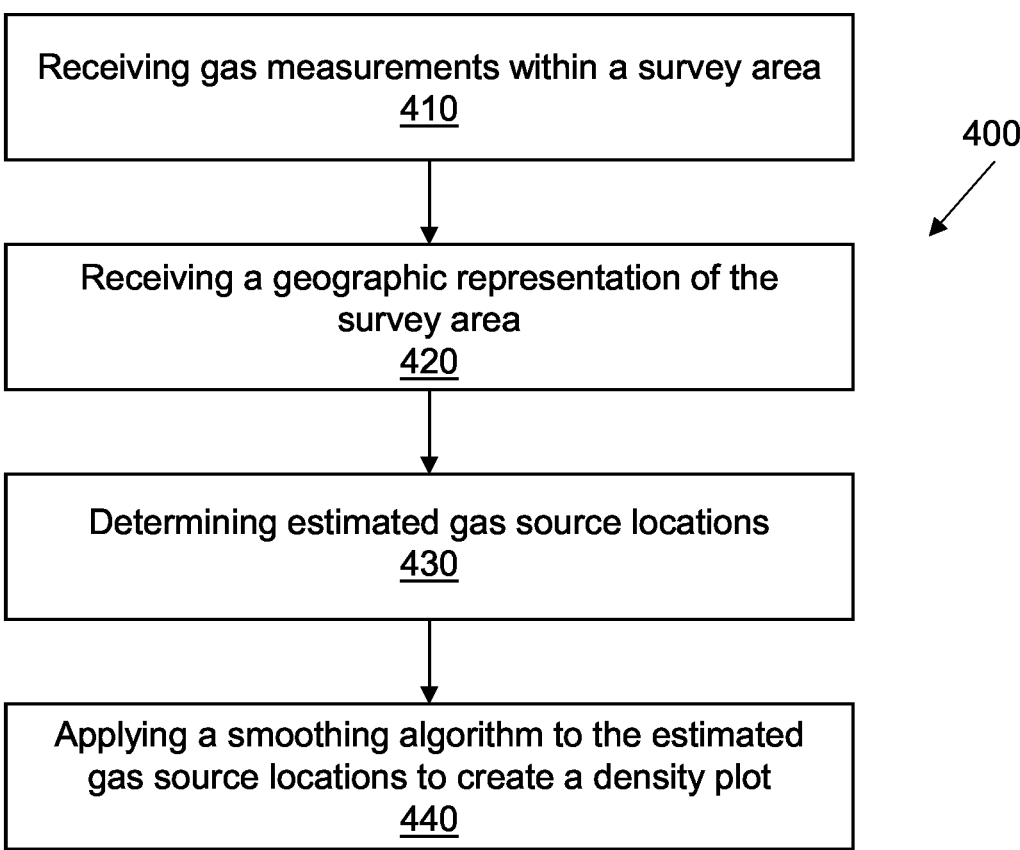
FIG. 4 is a flow chart of a method of generating a visualization for gas leak detection in an exemplary embodiment.

FIG. 4 illustrates a flow chart of an exemplary computer-implemented process 400 for visualizing gas leak detection data. The process 400 may be carried out by visualization system 100 (shown in FIG. 1), and more specifically, may be carried out by visualization computing device 102 (shown in FIG. 1).

Gas measurements are received 410 (e.g., by visualization computing device 102) from one or more sensors (e.g., detection sensors 108) for a plurality of measurement locations within a survey area. The gas measurements may include, for example, gas concentration measurements, global positioning system (GPS) measurements, wind velocity measurements, height and/or altitude measurements, and any other suitable measurements associated with visualizing gas detection data, as described further herein. A geographic representation of the survey area is received 420 (e.g., from database 106, shown in FIG. 1, by visualization computing device 102). The geographic representation may be received 420 by visualization computing device 102 from database 106 based upon location data included in the gas measurements, or the geographic representation may be received 420 by visualization computing device 102 from database 106 before gas measurements are received 410 (e.g., a user may input a location of the survey area into visualization computing device 102 before gas measurements are taken by detection sensors 108).

The received 410 gas measurement data is used to determine 430 (e.g., by visualization computing device 102) estimated gas source locations. The gas source locations may be, for example, one or more measurement locations of the plurality of measurement locations where a gas concentration measurement was at or above a threshold. The threshold may be relative to all the gas concentration measurements (e.g., all the gas concentration measurements may be compared, and a threshold may be determined based upon the measurements more likely to be associated with a gas source), or the threshold may be predetermined based on factors like the geography of the survey area, wind conditions at the survey area, etc.

A smoothing algorithm is applied 440 (e.g., by visualization computing device 102) to the estimated 430 gas source locations to create a multi-dimensional density plot. As described in more detail below, the smoothing algorithm may be a kernel density estimation (KDE) algorithm that utilizes point density data to estimate a corresponding probability density function, also referred to herein as the multi-dimensional density plot. The created multi-dimensional density plot may be superimposed on the received 420 geographical representation of the survey area to generate a graphic for display on a user device (e.g., user device 110, shown in FIG. 1).

Figure 5:
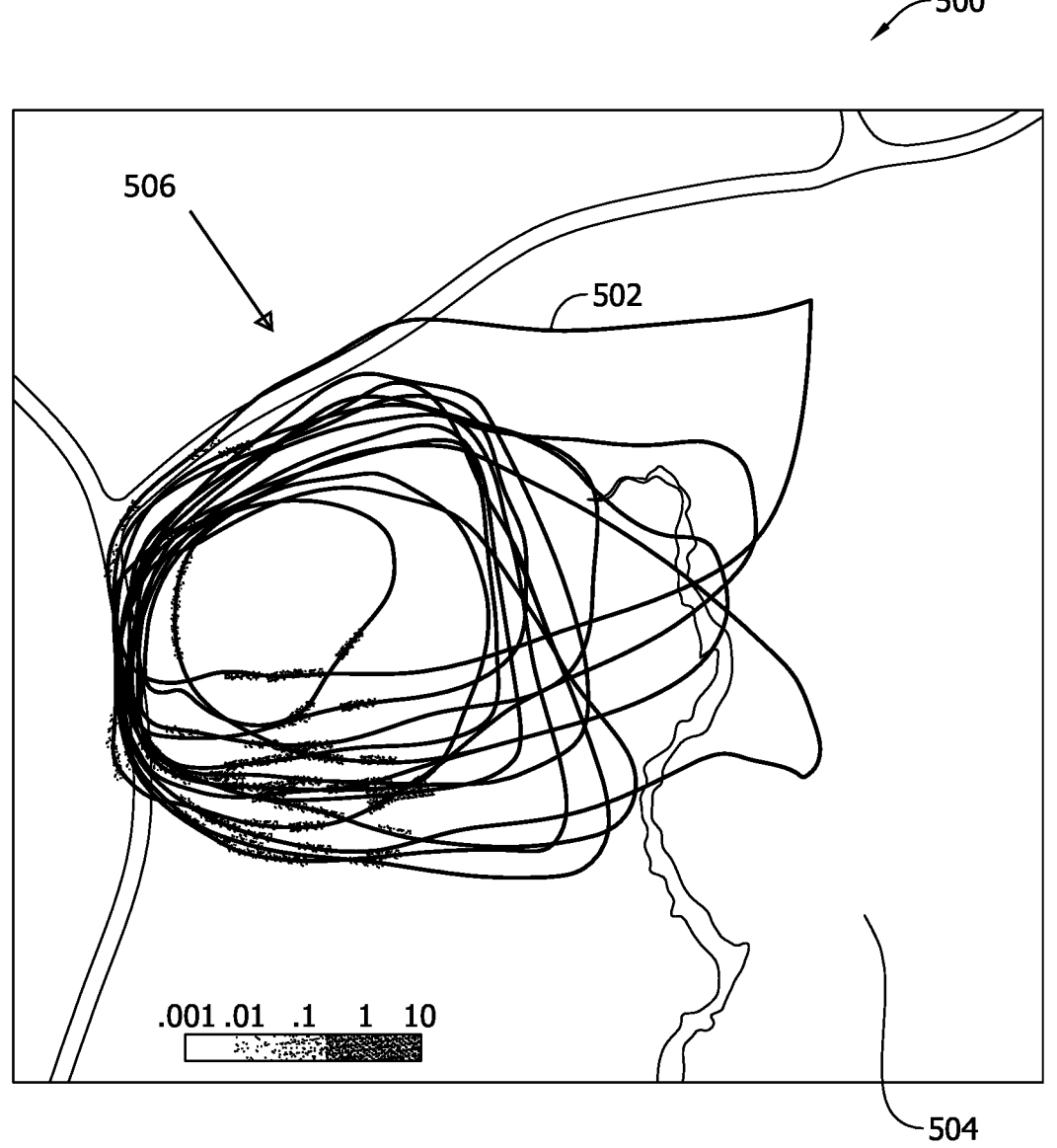
FIG. 5 depicts a graphic illustrating a flight path in an exemplary embodiment.

FIG. 5 depicts a graphic 500 that may be generated (e.g., by visualization computing device 102 for display on user device 110, shown in FIG. 1) to illustrate a flight path 502 of an unmanned aerial vehicle (UAV) and gas measurements made (e.g., by detection sensors 108, shown in FIG. 1) along flight path 502 in an exemplary embodiment. In FIG. 5, flight path 502 of the UAV is superimposed over a satellite image 504 of a portion of the earth that includes a survey area 506. Satellite image 504 may be retrieved from database 106, shown in FIG. 1, of visualization computing device 102 based on GPS data from detection sensors 108. It is contemplated that in other embodiments, flight path 502 of the UAV may be superimposed over other representations of the portion of the earth that includes survey area 506, such as two-dimensional and three-dimensional maps, including physical, topographical, and street maps. In FIG. 5, flight path 502 of the UAV is coded with a pattern to represent the concentration of a particular gas (e.g., methane) measured at each location. In other embodiments, flight path 502 of the UAV may be color-coded. Graphics similar to FIG. 5 may also be generated for walking and driving gas leak detection surveys to illustrate a path of a portable gas analyzer and its detection sensors, and the gas measurements made along that path.

Using the data collected by detection sensors 108 (e.g., gas concentration measurements associated with location and instrument/wind velocity measurements, as described above), estimated gas source locations can be predicted. For instance, visualization computing device 102 may receive the data collected by detection sensors 108 and calculate one or more estimated gas source locations from the data. In one illustrative embodiment, for each detection location at which the concentration of a gas of interest (e.g., methane) exceeds a threshold, visualization computing device 102 calculates an estimated location of the source of that gas, together with an associated spatial uncertainty ellipse.

Figure 6:
FIG. 6 depicts a graphic illustrating estimated gas source locations and corresponding uncertainty spatial ellipses in an exemplary embodiment.

FIG. 6 depicts a graphic that may be generated (e.g., by visualization computing device 102 for display on user device 110, shown in FIG. 1) to illustrate estimated gas source locations 602 and associated uncertainty spatial ellipses 604 determined by system 100, shown in FIG. 1 in an exemplary embodiment. In the exemplary embodiment, to illustrate this information, spatial ellipses are superimposed over a satellite image 606 similar to and retrieved similarly to satellite image 504, shown in FIG. 5. In other embodiments, spatial ellipses 604 may be represented by a yellow marker and superimposed over satellite image 606. Each spatial ellipse 604 has an apex 608 at a detection location (point at which the measured concentration of methane exceeded a threshold), contains a dot representing gas source location 602 for the gas measured at that detection location, and includes a periphery 610 representing uncertainty of spatial ellipse 604 associated with that estimated gas source location 602. In some embodiments, a color of the dot may contrast with a color of spatial ellipse 604. For example, when spatial ellipse 604 is a yellow marker, the dot may be white. As with FIG. 5, it is contemplated that satellite image 606 of FIG. 6 could be replaced with other representations of the portion of the earth that includes the survey area.

In the illustrative embodiment of FIG. 6, there are fifty-six individual detection locations (points at which the measured concentration of methane exceeded a threshold), each with a corresponding estimated gas source location 602 and an associated uncertainty spatial ellipse 604. While the graphic of FIG. 6 fully describes all the raw data from detection sensors 108 (shown in FIG. 1) and computed information on the estimated gas source locations 602 by visualization computing device 102, there are both technical and aesthetic reasons to simplify this graphic 600. From a technical perspective, multiple closely spaced gas detections are likely associated with the same gas source and, therefore, should often be aggregated as a single gas source. In other words, it is unlikely that there are fifty-six separate gas sources and much more likely that a few sources have been detected by detection sensors 108 repeatedly. From an aesthetic and actionability perspective, the number of markers in graphic 600 of FIG. 6 make it difficult for users (e.g., of user devices 110) to ascertain the most likely gas source locations 602.

Figure 7:
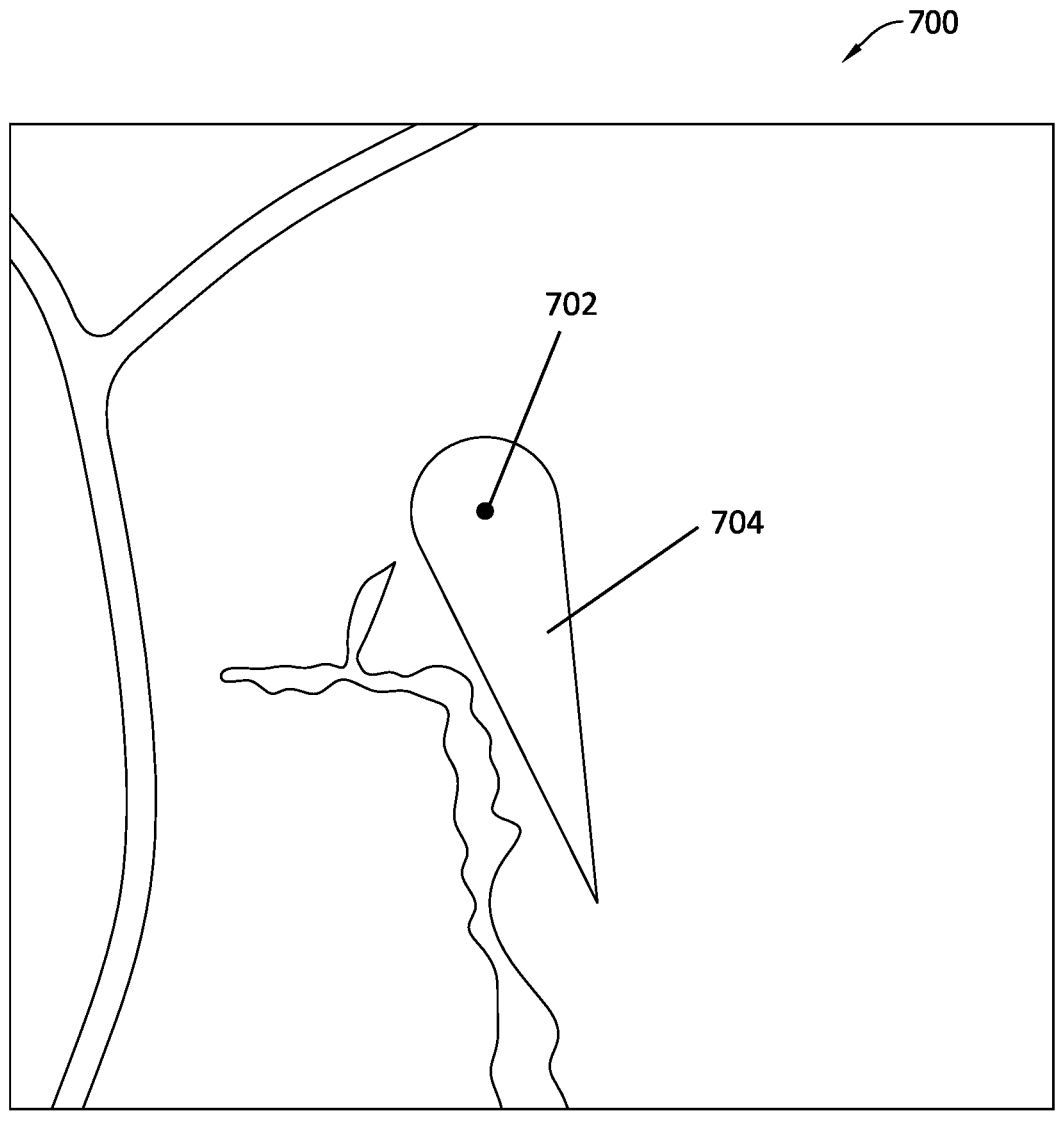
FIG. 7 depicts a graphic illustrating a detection location and a corresponding uncertainty spatial ellipse in an exemplary embodiment.

As shown in FIG. 7, one approach to simplify the presentation of this information is to aggregate (e.g., average) all the data represented by the fifty-six markers of FIG. 6 to arrive at a single estimated gas source location 702 and generate a graphic 700 including a single marker illustrating that estimated gas source location 702 and its associated uncertainty spatial ellipse 704. While fewer markers clearly offer a simpler view, it often oversimplifies the true picture (e.g., where multiple gas sources are present) and obscures the underlying data.

Another approach to improving the visualization of the gas leak detection data described above is to apply a smoothing algorithm to the estimated gas source locations to create a more accessible display of this information. In one illustrative embodiment of the present disclosure, a kernel density estimation (KDE) algorithm is used as the smoothing algorithm. KDE is a non-parametric approach that utilizes point density data to estimate a corresponding probability density function. Mathematically, the kernel density estimator is given by:

$$\hat{f}_h(x) = \frac{1}{nh} \sum_{i=1}^{n} K_h(x - x_i)$$

where K is the kernel function and h is a smoothing parameter referred to as the "bandwidth." A variety of different mathematical functions may be used as the kernel function K. In the illustrative embodiment corresponding to FIGS. 8-11D, a two-dimensional Gaussian function is used as the kernel function. It is contemplated that other embodiments may use a uniform (rectangular or "boxcar") function, a triangular function, an Epanechnikov (parabolic) function, quartic (biweight) function, triweight function, tricube function, cosine function, logistic function, sigmoid function, or another suitable function as the kernel function K.

As noted above, the smoothing (e.g., KDE) algorithm is applied, by visualization computing device 102, shown in FIG. 1, to the estimated gas source locations (e.g., estimated gas source locations 602, shown in FIG. 6) determined from the gas leak survey data generated by detection sensors 108, shown in FIG. 1. As such, and as described at least with respect to FIG. 4, the methods of the present disclosure may include obtaining estimated gas source locations. In various embodiments, "obtaining" these estimated gas source locations may involve receiving the estimated gas source locations from another source (e.g., from another computer), retrieving the estimated gas source locations from a local memory (e.g., database 106, shown in FIG. 1), and/or calculating, by visualization computing device 102, the estimated gas source locations from other data generated by detection sensors 108 (e.g., gas concentration measurements associated with location and instrument/wind velocity measurements received from a gas leak detection survey platform, as described above).

Figure 8:
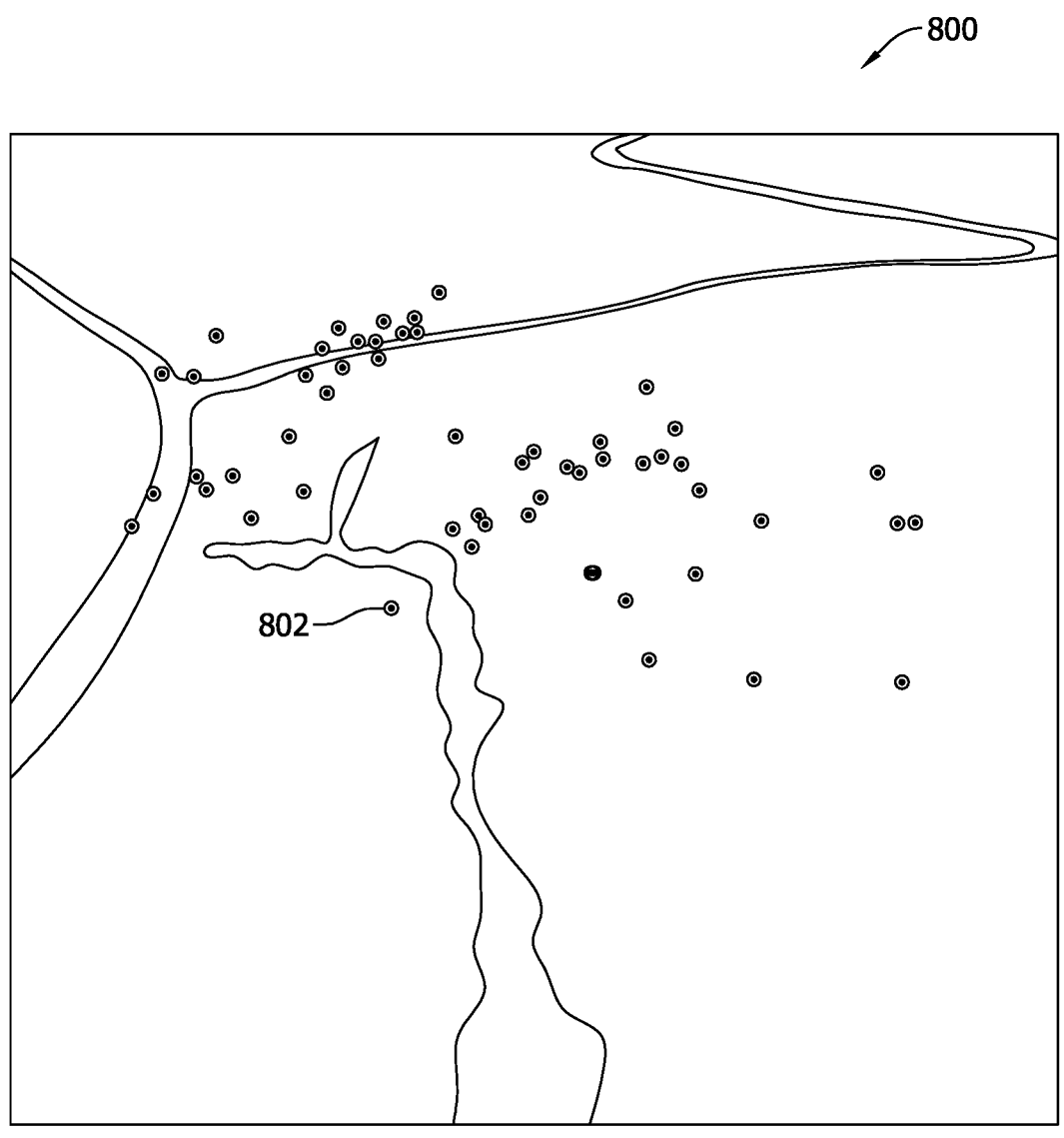
FIG. 8 depicts a graphic illustrating the estimated gas source locations of FIG. 6 in an exemplary embodiment.

FIG. 8 depicts a graphic 800 (e.g., generated by visualization computing device 102 to be displayed on user device 110, shown in FIG. 1) illustrating just estimated gas source locations 802 (e.g., just illustrating estimated gas source locations 602, shown in FIG. 6) in an exemplary embodiment. Whereas graphic 600 is embodied as a two-dimensional (overhead) view, graphic 800 is embodied as a quasi-three-dimensional (perspective) view. It is contemplated that any of the graphics of the present disclosure can be embodied in either two- or three-dimensional style views. In the illustrative embodiment of FIG. 8, all the estimated gas source locations 802 are equally weighted (e.g., each assigned an amplitude of 1 at the x-y coordinate corresponding to that location).

A smoothing algorithm is then used to calculate a density plot over the spatial extent of the data. As discussed above, in the illustrative embodiment, a KDE algorithm using a two-dimensional Gaussian function as the kernel function K is applied to the estimated gas source locations:

$$K_h(x, y) = \frac{2}{\sqrt{2\pi h}} \exp\left(\frac{x^2 + y^2}{2h}\right)$$

In the illustrative embodiment, a fixed bandwidth of h=0.00005 is used in both the x and y dimensions. When this KDE algorithm is applied by visualization computing device 102 to the data points of FIG. 8 (i.e., estimated gas source locations 802), visualization computing device 102 produces a kernel density plot 902 illustrated in FIG. 9.

Figure 9:
FIG. 9 depicts a graphic illustrating a result of applying a smoothing algorithm to the estimated gas source locations of FIG. 6 in an exemplary embodiment.

FIG. 9 depicts a graphic 900 illustrating a result of applying a smoothing algorithm to the estimated gas source locations (e.g., estimated gas source locations 602, shown in FIG. 6 and/or estimated gas source locations 802, shown in FIG. 8) in an exemplary embodiment. Graphic 900 may be generated, for example, by visualization computing device 102 for display on user device 110 (shown in FIG. 1). In this embodiment, graphic 900 includes kernel density plot 902, which is a result of applying the KDE algorithm described above to the estimated gas source locations, superimposed over a satellite image 904 similar to and retrieved in a similar way to that of satellite image 504 (shown in FIG. 5). As with each of the graphics discussed above, it is contemplated that satellite image 904 could be replaced with other representations (e.g., maps) of the portion of the earth that includes the survey area (e.g., survey area 506, shown in FIG. 5). In graphic 900, different patterns are used to represent different likelihoods of the presence of a gas source. Specifically, in this embodiment, the dark and closely patterned regions correspond to areas that have the highest likelihood of containing a gas source, and the lighter and not-as-closely-patterned a region is, the less likelihood the region has of containing a gas source. For example, the medium darkness and medium-closeness-patterned regions correspond to areas that have a moderately high likelihood of containing a gas source, the light darkness and further spaced-apart-patterned regions correspond to areas that have a moderately low likelihood of containing a gas source, the very light and very spaced-apart-patterned regions correspond to areas that have a low likelihood of containing a gas source, and transparent regions correspond to areas that have almost zero likelihood of containing a gas source.

In other embodiments, graphic 900 may include different colors used to represent different likelihoods of the presence of a gas source. For example, in these embodiments, red regions may correspond to areas that have the highest likelihood of containing a gas source, yellow regions may correspond to areas that have a moderately high likelihood of containing a gas source, green regions may correspond to areas that have a moderately low likelihood of containing a gas source, blue regions may correspond to areas that have a low likelihood of containing a gas source, and transparent regions may correspond to areas that have almost zero likelihood of containing a gas source.

Figure 10:
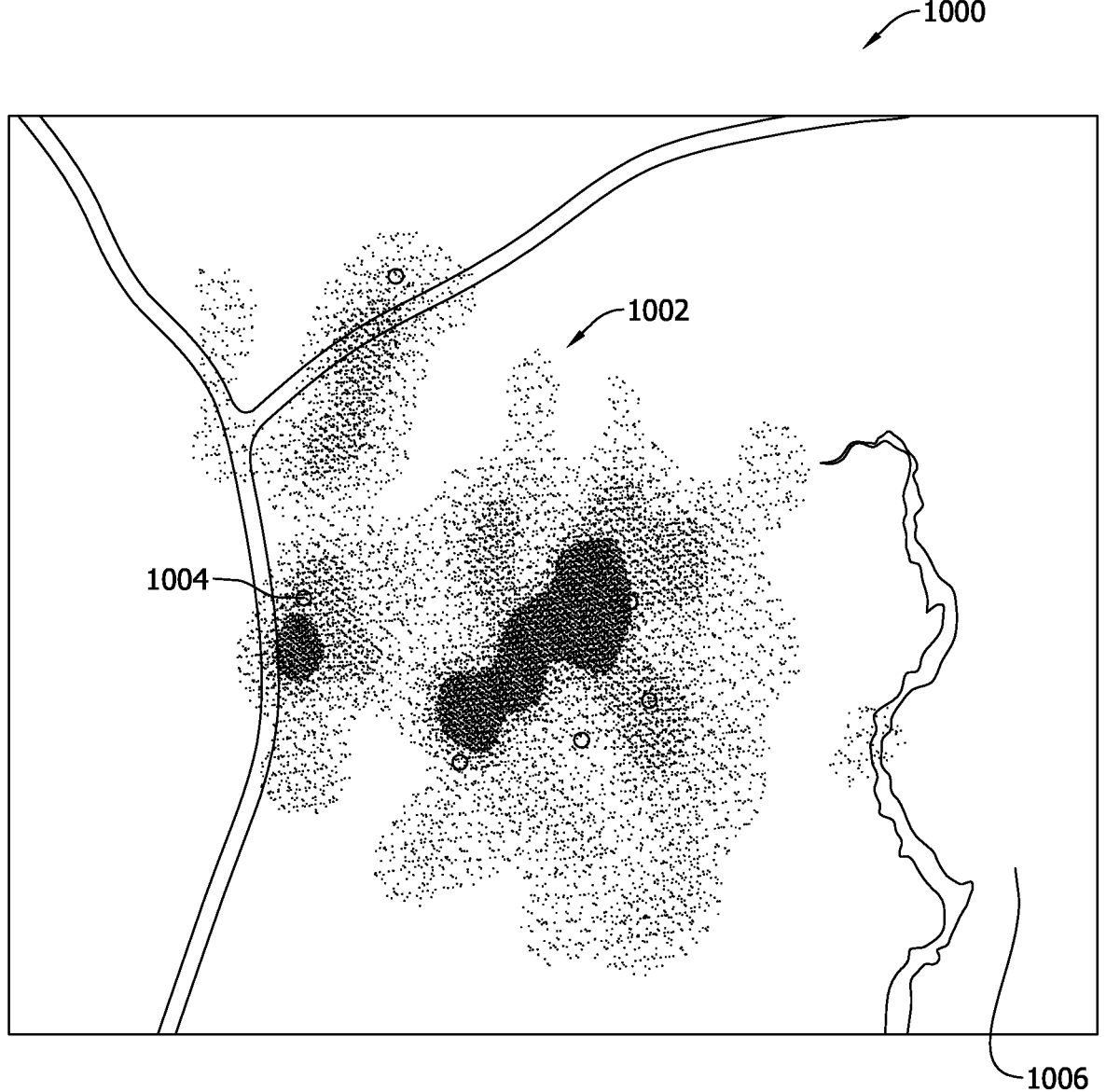
FIG. 10 depicts another graphic illustrating a result of applying a smoothing algorithm to the estimated gas source locations of FIG. 6 in an exemplary embodiment.

FIG. 10 depicts another graphic 100 illustrating a result of applying a smoothing algorithm to the estimated gas source locations (e.g., estimated gas source locations 602, shown in FIG. 6, and estimated gas source locations 802, shown in FIG. 8) in an exemplary embodiment. Graphic 1000 may be generated, for example, by visualization computing device 102 for display on user device 110, as shown in FIG. 1. Whereas graphic 900 is depicted as a quasi-three-dimensional (perspective) view, graphic 1000 is depicted as a two-dimensional (overhead) view. Like graphic 900, a kernel density plot 1002 in graphic 1000 uses different patterns to represent different likelihoods of the presence of a gas source (with the pattern, or lack thereof, having the same meanings described above with respect to FIG. 9). Also like graphic 900, kernel density plot 1002 in graphic 1000 may also use different colors to represent different likelihoods of the presence of a gas source (with the colors, or lack thereof, having the same meanings described above with respect to FIG. 9). FIG. 10 also includes a plurality of graphical elements 1004 (in this embodiment, dots) representing gas sources superimposed over kernel density plot 1002 and a satellite image 1006. In other embodiments, graphical elements 1004 may include dots with corresponding text labels, and the text labels may indicate the likelihood of the dot being the gas source and/or label the different gas sources.

In the illustrative embodiment described above, all the estimated gas source locations were equally weighted (e.g., each assigned an amplitude of 1 at the x-y coordinate corresponding to that location). In other embodiments, however, the amplitude assigned to each estimated gas source location can vary. For instance, in some embodiments, each estimated gas source location may be assigned a value that more accurately describes the magnitude of the measured gas concentration used to calculate that estimated gas source location. For example, a determined flux (scfh) or the product of measured methane concentration (ppm) multiplied by measured wind speed (m/s) could be used as a weighting factor in some embodiments.

In the illustrative embodiment described above, the same fixed bandwidth (h) was used along both x and y dimensions. In other embodiments, however, different bandwidth values for each dimension and/or a variable bandwidth (h) can be used to improve the visualization.

Figures 11A, 11B, 11C, 11D:
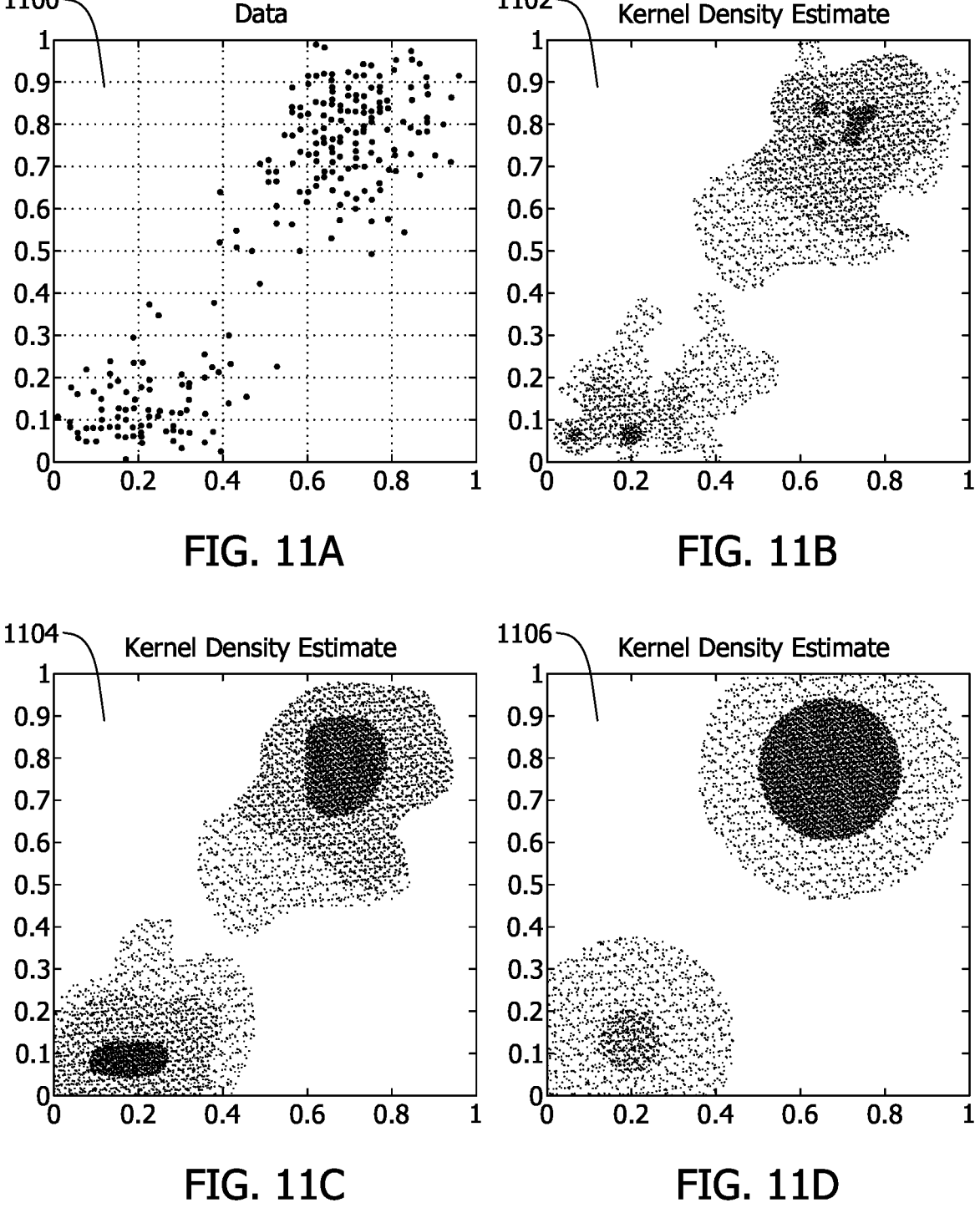
FIG. 11A depicts randomly chosen two-dimensional point density data in an exemplary embodiment.
FIG. 11B depicts a resulting kernel density plot after application of an algorithm to the data of FIG. 11A in an exemplary embodiment.
FIG. 11C depicts another resulting kernel density plot after application of an algorithm to the data of FIG. 11A in an exemplary embodiment.
FIG. 11D depicts yet another resulting kernel density plot after application of an algorithm to the data of FIG. 11A in an exemplary embodiment.

The choice of bandwidth (h) can significantly affect the accuracy of the resulting distribution, as illustrated by FIGS. 11A-11D. FIG. 11A depicts a set 1100 of randomly chosen two-dimensional point density data. FIG. 11B depicts a resulting kernel density plot 1102 after application of a KDE algorithm using a bandwidth that is too small, resulting in under-smoothing. FIG. 11C depicts a resulting kernel density plot 1104 after application of a KDE algorithm using an optimal bandwidth that properly smooths the point density data. Finally, FIG. 11D depicts a resulting kernel density plot 1106 after application of a KDE algorithm using a bandwidth that is too large, resulting in over-smoothing.

In some embodiments, the bandwidth (h) may be defined with respect to a cost function corresponding to an error relevant to the problem, and minimizing that error can yield a more optimal bandwidth. For embodiments using a KDE algorithm, the cost function may be defined as the mean integrated squared error or an equivalent function. For instance, assuming a survey area that contains one or more small (point) sources that disperse gas on a relatively calm day, the radius of the gas plume will expand as it moves away from the source. In the case of a UAV survey, this behavior could be accounted for by using a bandwidth that changes as a function of the altitude of the UAV when the corresponding measurement was taken. In contrast to small (point) sources, gas plumes from extended sources (e.g., ponds) will be expected to expand in radius differently. As such, some embodiments of the smoothing algorithm may utilize an adaptive bandwidth technique that varies the numerical value of h spatially based on expected physical properties of the source.

In still other embodiments, the bandwidth (h) and orientation of the kernel (K) can be determined by properties of the individual emission measurements. For instance, the smoothing function of the algorithm can be increased when multiple gas peaks are detected very near to one another and/or when the local wind variability is large. As another alternative, an angular and distance uncertainty of each emission calculated by the location estimation algorithm could be used as the smoothing kernel. In certain circumstances, this approach may result in a more accurate representation of the source location probability distribution in the smoothed visualization. In other words, emission indications which have a larger uncertainty would be smoothed over a larger area, while emission indications with narrower positional uncertainty would be smoothed over a smaller area.

For example, implementation of the KDE calculation may require that the survey area be divided into a grid (e.g., 5000×5000), with each grid square having its own unique GPS coordinates or other numerical designation. These GPS coordinates or other numerical designations correspond to x and y in the formula below. Additionally, all n estimated source locations may have their own unique GPS coordinates or other numerical designations, and these GPS coordinates or other numerical designations correspond to $x_i$ and $y_i$ in the formula below. The image of the kernel density estimate is then obtained by calculating a summed value, using the formula below, for every location (e.g., every x and y coordinate pair) on the grid:

$$\hat{f}_h(x, y) = \frac{1}{nh} \sum_{i=1}^{n} \frac{2}{\sqrt{2\pi h}} \exp\left(\frac{(x - x_i)^2 + (y - y_i)^2}{2h}\right)$$

With this calculation, every location (e.g., every x and y coordinate pair) has a summed value. The summed value may be converted into a color or pattern, as described above, which forms the relevant KDE image.

Some embodiments of the present disclosure may further utilize techniques for detecting and/or removing potential sampling bias from the data. Surveyors do not necessarily measure gas properties at all locations in an equal manner. Indeed, the number of detections in one area may outnumber the number of detections in another area simply because the analyzer remained in one area longer than the other area. This may artificially increase the point density in that area (a sampling bias), giving the impression that the probability associated with finding an emission location is incorrectly higher in one area than another. One technique that may be used to detect sampling bias is k-fold validation, in which the data is randomly separated into multiple subgroups, the smoothing algorithm is applied to each subgroup, and the error associated with the difference between the results from each subgroup provides an indication of the extent of sampling bias. In some embodiments, sampling bias can be removed by calculating the likelihood that a kernel location was over-sampled and normalizing for the calculated sample density. For example, the expected origination path measurements looking upwind can be calculated (using either the local wind properties or a wind field model), and the amplitude of the kernel can then be normalized by the number of path measurements that are downwind. Since few or no wind paths will pass exactly through the emission point, nearby wind paths can be included with a weight that decreases with distance from the emission point.

While the present disclosure has primarily referred to the use of a KDE algorithm, it is contemplated that other smoothing algorithms can be applied to the estimated gas source location data. In some embodiments, the estimated gas source location data may first be binned into regular (or semi-regular) bins and then smoothed in the spatial dimensions. Additionally, it is contemplated that the KDE (or other) smoothing algorithm could be applied to the detection locations (i.e., points where the measured gas concentration exceeded a threshold) and/or to the spatial uncertainty ellipses (see FIG. 6) in a similar manner to the estimated gas source locations.

An example technical effect of the system and methods described herein includes one or more of (a) receiving and analyzing gas leak sensor data; (b) optimizing a smoothing algorithm for visualizing gas leak sensor data; (c) providing a visualization of gas leak sensor data that is easily read; and (d) allowing users to quickly and efficiently locate and repair a gas leak source.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A visualization system for visualizing gas leak detection data including a processor in communication with at least one memory device, wherein the processor is configured to:

receive, from the at least one memory device, a geographic representation of a survey area;

receive, from one or more sensors that comprise one or more gas concentration sensors, gas measurement data for a plurality of measurement locations within the survey area, wherein the gas measurement data includes gas concentration data measured by the one or more gas concentration sensors;

determine, based upon the gas measurement data and the geographic representation, estimated gas source locations of the plurality of measurement locations, wherein the estimated gas source locations include one or more measurement locations of the plurality of measurement locations where the gas concentration data is at or above a threshold; and utilize, by a smoothing algorithm, point density data of the estimated gas source locations to create a multi-dimensional density plot.

2. The visualization system of claim 1, wherein the processor is further configured to generate a graphic comprising the multi-dimensional density plot superimposed on the geographic representation of the survey area.

3. The visualization system of claim 1, wherein the one or more sensors are moved through the survey area, and wherein the one or more sensors perform gas measurements at the plurality of measurement locations as the one or more sensors are moved within the survey area.

4. The visualization system of claim 1, wherein the gas measurement data further includes at least one of global positioning system (GPS) data associated with the gas concentration data and wind velocity data associated with the gas concentration data.

5. The visualization system of claim 1, wherein the smoothing algorithm comprises a kernel density estimation (KDE) algorithm having a kernel function and a bandwidth.

6. The visualization system of claim 5, wherein the kernel function is a two-dimensional Gaussian function.

7. The visualization system of claim 5, wherein the processor is further configured to:

adjust the kernel function based on a local density of the estimated gas source locations; and/or adjust the kernel function based on an uncertainty value associated with the estimated gas source locations.

8. The visualization system of claim 7, wherein the uncertainty value represents a variability of wind measurements associated with the estimated gas source locations.

9. The visualization system of claim 5, wherein the bandwidth is a fixed bandwidth.

10. The visualization system of claim 5, wherein the bandwidth differs between an x dimension and a y dimension.

11. The visualization system of claim 5, wherein the bandwidth is varied spatially to minimize an error value associated with a cost function, and wherein the cost function is a mean integrated squared error.

12. The visualization system of claim 1, wherein the processor is further configured to:

weight each estimated gas source location prior to applying the smoothing algorithm to the respective estimated gas source locations.

13. The visualization system of claim 12, wherein the weighting of each estimated gas source location is a function of the gas measurement data associated with each estimated gas source location.

14. The visualization system of claim 1, wherein the processor is further configured to:

detect sampling bias by applying k-fold validation to the estimated gas source locations.

15. The visualization system of claim 14, wherein the processor is further configured to:

remove the sampling bias by calculating a likelihood that a kernel location was over-sampled and normalizing for calculated sample density.

16. The visualization system of claim 1, wherein the geographic representation comprises at least one of a satellite image and a street map.

17. The visualization system of claim 1, wherein the multi-dimensional density plot includes at least one of a plurality of colors and a plurality of patterns indicating different likelihoods of a presence of a gas source, and wherein transparent regions of the multi-dimensional density plot indicate the lowest likelihood of the presence of a gas source.

18. A computer-implemented method for visualizing gas leak detection data, the computer-implemented method performed by a visualization system including a processor in communication with at least one memory device, the computer-implemented method comprising:

receiving, from the at least one memory device, a geographic representation of a survey area;

receiving, from one or more sensors that comprise one or more gas concentration sensors, gas measurement data for a plurality of measurement locations within the survey area, wherein the gas measurement data includes gas concentration data measured by the one or more gas concentration sensors;

determining, based upon the gas measurement data and the geographic representation, estimated gas source locations of the plurality of measurement locations, wherein the estimated gas source locations include one or more measurement locations of the plurality of measurement locations where the gas concentration data is at or above a threshold; and utilizing, by a smoothing algorithm, point density data of the estimated gas source locations to create a multi-dimensional density plot.

19. The computer-implemented method of claim 18 further comprising:

generating a graphic comprising the multi-dimensional density plot superimposed on the geographic representation of the survey area.

20. A non-transitory computer-readable media having computer-executable instructions embodied thereon, wherein when executed by a visualization system including a processor in communication with at least one memory device, the computer-executable instructions cause the processor to:

receive, from the at least one memory device, a geographic representation of a survey area;

receive, from one or more sensors that comprise one or more gas concentration sensors, gas measurement data for a plurality of measurement locations within the survey area, wherein the gas measurement data includes gas concentration data measured by the one or more gas concentration sensors;

determine, based upon the gas measurement data and the geographic representation, estimated gas source locations of the plurality of measurement locations, wherein the estimated gas source locations include one or more measurement locations of the plurality of measurement locations where the gas concentration data is at or above a threshold; and utilize, by a smoothing algorithm, point density data of the estimated gas source locations to create a multi-dimensional density plot.

\* \* \* \* \*